(12) United States Patent
Kiker

(10) Patent No.: US 9,149,075 B2
(45) Date of Patent: Oct. 6, 2015

(54) METHOD FOR PROVIDING AN INVENTORY OF GARMENTS AND SIMILAR ITEMS WITH MODULAR INSCRIPTIONS

(76) Inventor: Paula McDermott Kiker, Winnie, TX (US)

(*) Notice: Subject to any disclaimer, the term of this patent is extended or adjusted under 35 U.S.C. 154(b) by 235 days.

(21) Appl. No.: 13/591,182

(22) Filed: Aug. 21, 2012

(65) Prior Publication Data

US 2012/0317057 A1 Dec. 13, 2012

Related U.S. Application Data

(62) Division of application No. 12/154,945, filed on May 28, 2008, now abandoned.

(51) Int. Cl.
*G06Q 90/00* (2006.01)
*A41B 15/02* (2006.01)
*A41D 27/08* (2006.01)
*G06Q 10/08* (2012.01)
*A41D 27/20* (2006.01)

(52) U.S. Cl.
CPC ............... *A41B 15/02* (2013.01); *A41D 27/08* (2013.01); *G06Q 10/087* (2013.01); *A41D 27/20* (2013.01); *Y10T 29/49826* (2015.01); *Y10T 29/49915* (2015.01)

(58) Field of Classification Search
CPC ..... A41B 15/02; G06Q 10/087; A41D 27/08; A41D 27/20; Y10T 29/49915; Y10T 29/49826
USPC ............. 29/509, 428; 705/500, 28, 29; 2/108, 2/93, 84, 85, 246, 247
See application file for complete search history.

(56) References Cited

U.S. PATENT DOCUMENTS 2,530,453 A * 11/1950 Eagle ................................ 2/247
6,848,118 B2 2/2005 Barnes et al.
2006/0015987 A1 * 1/2006 Anderson ........................ 2/247

* cited by examiner

*Primary Examiner* — John C Hong

(57) ABSTRACT

A product and process for providing customized garments. The garment comprises a main body having inner and outer surfaces. At least one pocket having a first inner surface and a first outer surface defines a slot between the outer surface of the main body and the first inner surface of the pocket. The pocket is affixed to the outer surface of the main body, with the pocket having an opening there into. An insert is selectively slidably receivable within and removable from the slot. The insert has a flap portion at one end thereof and protruding outside of and at least partially over the pocket and containing inscriptions thereon. The insert is secured within the pocket such that it is easily removable there from. An inventory process of manufacture and product of the process utilizing this product allows for rapid customization with existing inventory.

16 Claims, 3 Drawing Sheets

METHOD FOR PROVIDING AN INVENTORY OF GARMENTS AND SIMILAR ITEMS WITH MODULAR INSCRIPTIONS

CROSS REFERENCE TO RELATED APPLICATIONS

Application claims priority to previously filed U.S. patent application Ser. No. 12/154,945 titled "Garment with Customized Pocket Inserts" filed by on May 28, 2008. The entire disclosure of the above identified related application is hereby fully incorporated herein by reference.

BACKGROUND OF THE INVENTION

1. Field of the Invention

The present invention relates to garments and similar items of the type that may be adorned with decorative or other inscriptions, or the like, which are intended to provide a visual flourish that is appropriate for sports activities and events, or the like, such as for school or church organizations, charities, non-profit and other organizations. The process for providing an inscribed garment is time consuming, requiring the entire garment to be available.

2. Brief Description of the Prior Art

Garments contemplated for use in the present invention include pullover jackets, "T" and other shirts, shorts, pants, coats, and the like. Garments as referred to herein also includes items that may be carried by the person, such as purses, pocket books, luggage, brief cases, computer and other bags, and the like. For exemplary purposes, a jacket will be discussed.

A pullover jacket typically is characterized by a clothing construction that facilitates its being slipped on and off over the head and shoulders. Such jackets often are provided with insignias, writings, symbols, illustrations, mottos, and other similar "inscriptions", as that term is herein used in the specification and claims, which are chosen by individuals or organizations as a matter of personal preference or as an emblem of group identity.

In view of the many different colors and designs that often are ordered for immediate delivery, sales organizations that carry such outer garments have had to maintain unduly large and costly inventories in order to accommodate a diversity of customers. The pockets may be arranged on any part of the garment outer surface, such as, for example, on one or more sleeves, on one side of a frontal section, and/or on the back outer surface of the garment.

In U.S. Pat. No. 6,848,118, entitled "Pullover Jacket with Customized Decorative Band", there is disclosed a product and process for providing a pullover body with a pre-selected band, using mating fasteners. The band may contain lettering or other decorative materials. The resultant product does not provide for an insert into a pocket which has insignias on a flap component and thus is not easily selectively removable or replaceable either during the manufacturing process or subsequently during actual use by the customer in the event that an insignia is desired to be replaced by yet another insignia.

These problems necessitating a large inventory are not limited to pull over jackets. Any inscribed item, from bags to caps, also suffer from these issues.

Typically, when such inscriptions are needed, the inscription is made directly on the garment. Since these items tend to be large items, such as an article of clothing or a bag, they are cumbersome to inscribe, requiring specialized equipment. The customer may purchase the product, but it then needs to undergo a time-intensive inscription process by the seller or a sub-contractor before it is presented to the customer.

SUMMARY OF THE INVENTION

The invention comprises a garment, as described and defined herein. The garment comprises a main body having inner and outer surfaces. At least one pocket has a first inner surface and a first outer surface and defines a slot between the outer surface of the main body and the first inner surface of the pocket. The pocket is affixed to the outer surface of the main body, with the pocket having an opening there into. An insert is selectively slidably receivable within and removable from the slot, said insert having a flap portion at one end thereof and protruding outside of and at least partially over the pocket and containing inscriptions thereon. As used herein "inscriptions" means any sort of writings, regardless of language used, in print or otherwise, letters, numbers, colors alone or in combination with other features, logos, and the like. Means, such as complimentary Velcro strips, buttons, snaps, hook and eye, or the like, are provided on the insert and a surface of either the pocket or the main body of the garment for selectively securing the insert within the pocket.

An inventory process of providing customized or non-customized garment units is also disclosed and claimed. The process is characterized by the steps of providing a number of first construction units, each such unit comprising: (a) a main body having inner and outer surfaces; (b) at least one pocket having a first inner surface and a first outer surface, and which defines a slot between the first inner surface of the pocket and the outer surface of the main body, said pocket being affixed to the outer surface of said main body, said pocket having an opening there into.

A selected number of second construction units are provided each of which comprises: (a) an insert selectively slideably receivable within and removable from said slot and through said opening, said insert having a flap portion at one end thereof and protruding outside of and at least partially over said pocket; and (b) means for selectively securing the insert within the pocket.

The process includes the steps of first acquiring an inventory of said first body construction units, said first body construction units being of different sizes and having a pocket of varying sizes and configurations affixed in various locations upon said outer surface.

Secondly, an inventory of said second construction units is acquired, said second construction units being of different sizes and configurations for complimentary receipt into said pockets.

Next, orders may be received for the garments from customers, such that the assembly provides customized garments consistent with the particular order. Thirdly, the inscriptions are applied as instructed in said orders onto a selected number of the flaps.

Fourthly, the selected first construction units are assembled with the selected second construction units by inserting one of the second construction units into each of the pockets of the first construction units and selectively but removeably securing each of said second construction units into position within each of said pockets, such that the flap portion of said second construction unit with said inscriptions thereon protrudes outwardly of said pocket.

DETAILED DESCRIPTION OF THE INVENTION

Figure 1:
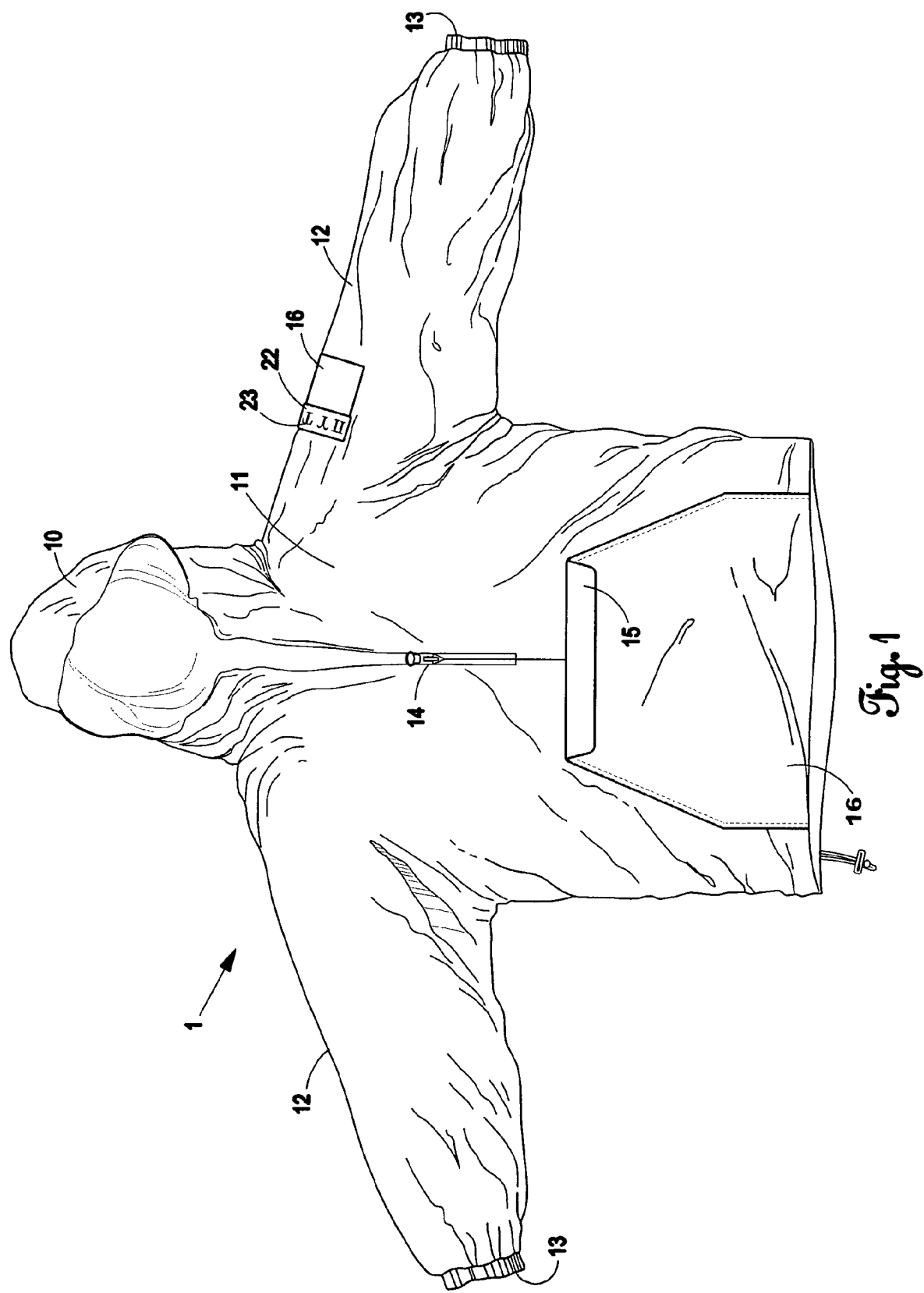
FIG. 1 is a frontal view of an outer garment of the present invention in the form of a jacket, with pockets and inserts on the exterior of one of the sleeves.
Figure 2:
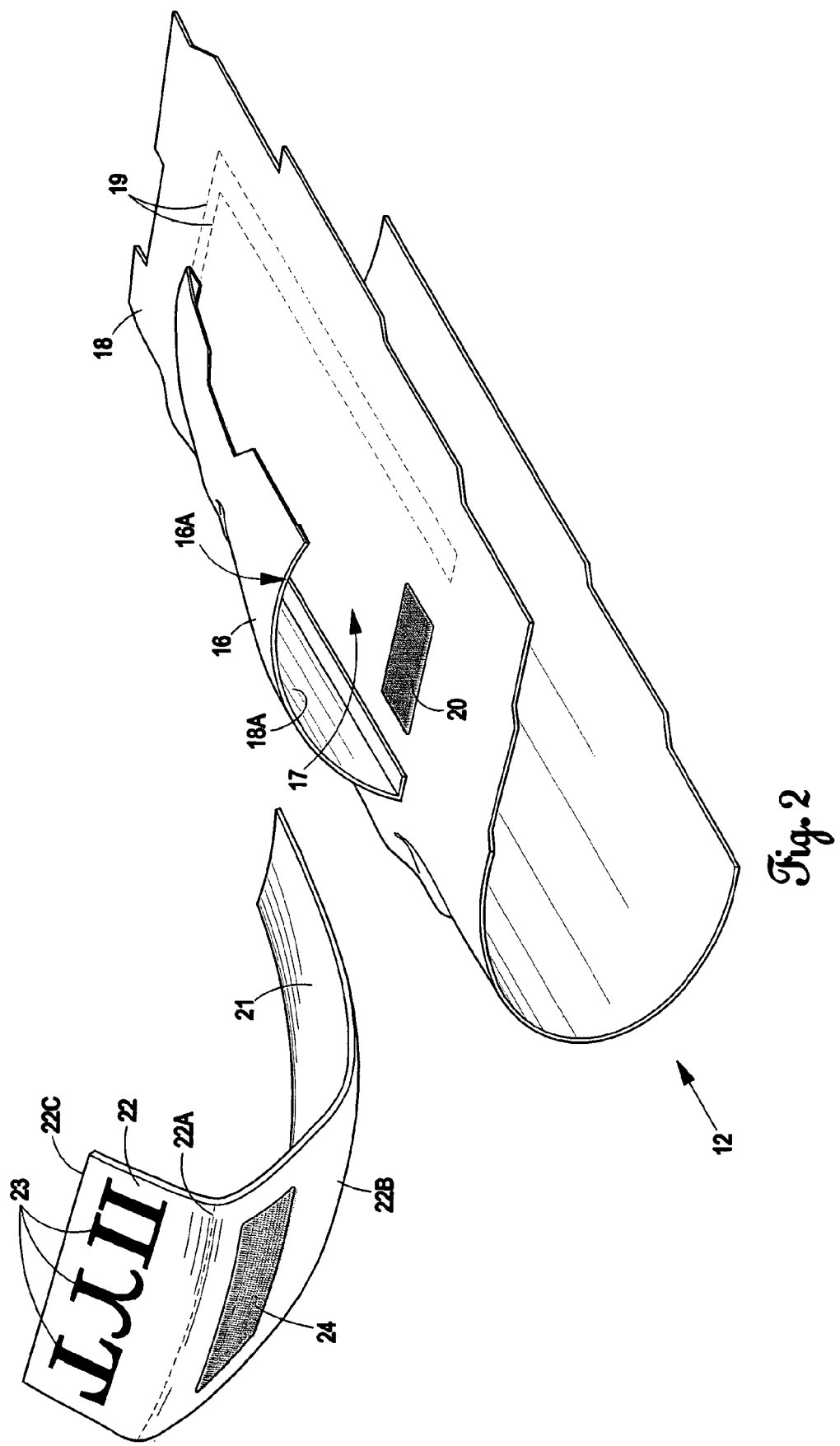
FIG. 2 is a perspective view of a sleeve with the pocket and insert prior to affixation of the insert into the pocket.

Now with first reference to FIGS. 1 and 2, there is shown an outer garment 1, in the form of a pull over jacket or sweater. The garment consists of a hood portion 10, which extends upwardly from a main body 11 of the garment 1. Extending outwardly from the main body 11 are first and second, or left and right, sleeves 12, each sleeve 12 having an opening 13 for light securement of a human arm there through.

The main body 11 of the garment 1 has a frontal pocket 16 of conventional construction, with flap portion 15 as a part thereof. When stitched or otherwise permanently secured to the outer surface 18, the pocket 16 provides an opening 16A at its upper end. In combination with the stitching 19 of the pocket 16 to the outer surface 18, the opening 16A provides a slot 17 at the upper end of the pocket 16. The slot 17 is thus defined between the first inner surface 18A of the pocket 16 and the outer surface 18 of the sleeve 12 of garment 1. It is through this opening 16A that the insert 21 may be selectively inserted, secured and later removed, if desired, into and out of, the slot 17 of the pocket 16.

The insert 21 includes a flap portion 22 at one end thereof which has a permanent fold 22A embedded thereon, by conventional manufacturing means. On a side 22B of the insert 21 is a rectangularly configured Velcro member 24, which mates with a companion Velcro member 20 secured to the outer sleeve surface 18 of the garment 1. The insert 21 also has an upper flap portion 22 which, when the insert 21 is securely placed within the pocket 16 (FIG. 1 and FIG. 3), fold over, slightly, over the top of the pocket 16, extending from a fold 22A to the exterior end 22C.

Prior to securing the insert 21 inside the pocket 16, the flap 22 is inscribed with inscriptions 23, such as Greek letters identifying a sorority or a fraternity, or other inscriptions desired by the customer.

Figure 3:
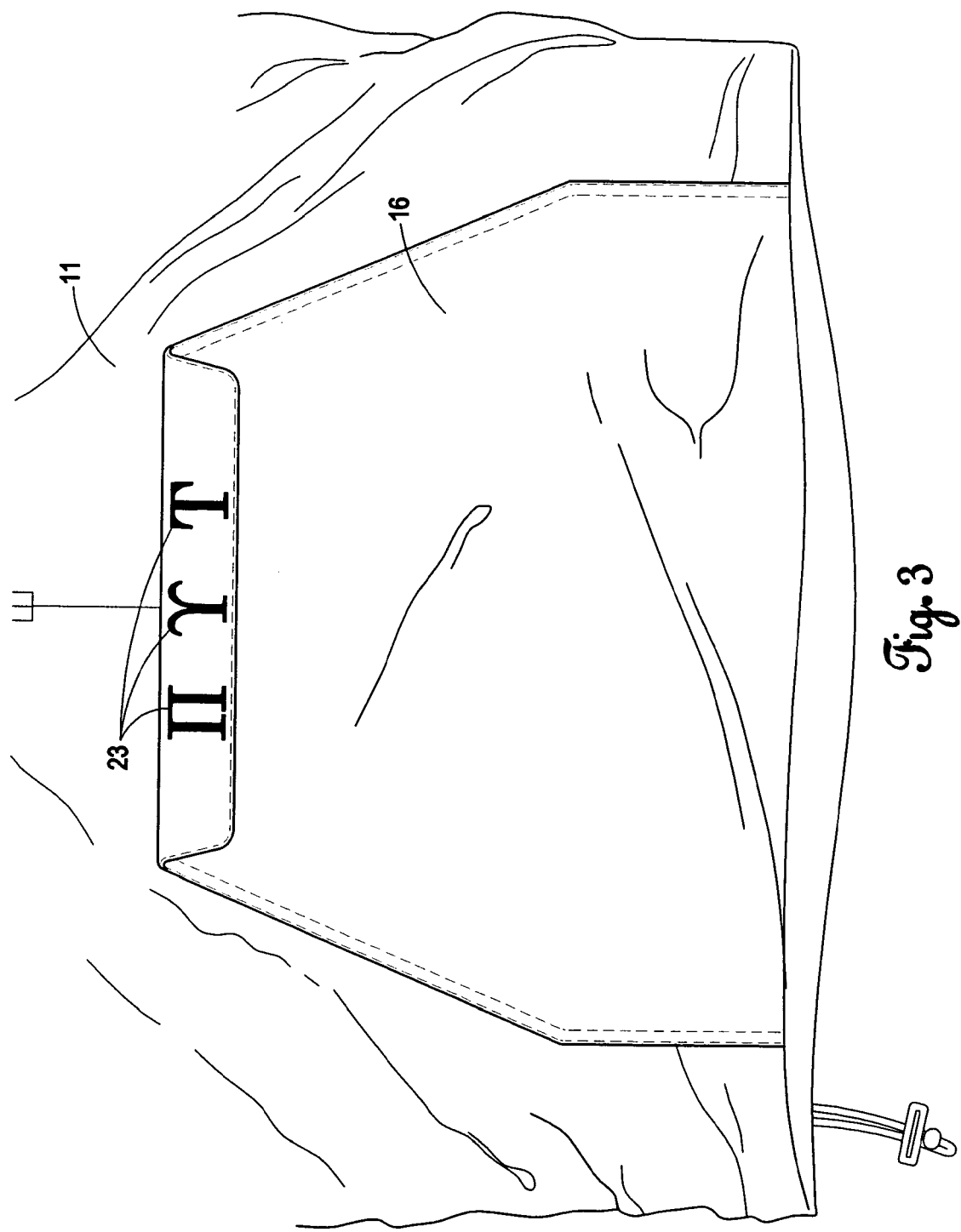
FIG. 3 is a view similar to that of FIG. 1, and illustrating the pocket and insert provided on the front body of the garment.

Now with reference to FIG. 3, the pocket 16 and insert 21 are shown secured together in place and on the front of the garment 1. The geometric configuration of each of the pockets 16 and insert 21 need not be square or rectangular, or any other particular size or configuration, and may be placed on any of a number of desired locations upon the garment 1.

It will be appreciated that the insert 21 need not necessarily be secured into the pocket 16 during manufacture, but may be provided as a separate part, such as with the garment 1, and may be inserted into the pocket 16 at a later time and location by the customer.

It will also be appreciated that one of the benefits of the use of the present invention is that inserts having different inscriptions may be selectively inserted and removed from the pocket 16, as desired by the customer.

The method of manufacture is as described above, under the "Summary of the Invention" section of this disclosure, will be elaborated on below.

The inventory of garments 1 and inserts 21 may be obtained from a common source or independent sources. Store owners may decide to carry a set number of garments 1 but a larger number of inserts 21 with the intent of making sure they have enough inserts 21 to accommodate any requests made in a given period of time. This allows for more customer choice with less expense for the store owner. The inserts 21 may be designed such that when the garments 1 are later updated to reflect new fashion trends, the inserts 21 are still usable. In this exemplary embodiment, this would be done by keeping the pocket 16 of a minimum size. Sufficient stock of inserts 21 may be maintained to account for various pocket 16 designs and sizes. Insert 21 compatibility may be accomplished by other mechanisms.

In one exemplary embodiment, a customer may enter a store and request a garment 1 with a particular inscription. The customer selects the garment 1 and the appropriate inscription. The seller collects the appropriate garment 1 and insert 21 with the requested inscription. The seller then couples the insert with the garment to present to the customer. This allows a customized inscription with minimal wait on the part of the customer. An example would be for a store that supplied garments 1 to local schools. Customers could come in and select their garment 1, then request the insert 21 for their school. Additionally, the same customer could come in at a later time and request an insert 21 for an intermural team without needing an entirely new garment 1.

In another exemplary embodiment, a customer may purchase one garment 1 but obtain multiple inserts 21 to create multiple customized garments 1. An example could include one insert 21 designating their school with the school inscription, another insert 21 designating their affiliation with a fraternal organization along with their inscription, another insert 21 designating their affiliation with an intermural organization. In one single transaction, the customer will obtain multiple customized garments 1 with minimal investment.

In another exemplary embodiment, a customer may wish to purchase an insert 21 with a non-standard inscription. An example would be a person's initials. In this embodiment, the customer would select the garment 1 and provide specifications of the insert's 21 inscription. The inscription is then placed on the insert 21 and provided to the customer.

In another exemplary embodiment, garments 1 may be purchased from a supplier with the pocket 16 already installed. Inserts 21 may be made by a separate supplier. This system allows a garment 1 to be customized without necessitating the entire garment 1 being customized.

In another exemplary embodiment, the garment 1 and the insert 21 are supplied independently of each other. The garment 1 may be supplied by an outside supplier, while the inserts 21 are made by a sub-contractor of the seller. Alternately, the garment 1 and the inserts 21 may be supplied by two different suppliers.

In another exemplary embodiment, the garment 1 may be obtained from a supplier and modified to become compatible with the inventory process. The garment 1 is received from a supplier and the pocket 16 is created on the garment 1 by any means know to those skilled in the art. One example would be sewing extra fabric on the outer surface of the garment 1 to create the pocket 16 compatible with the inventory process. This allows for the garment to supplied from multiple suppliers, but all made compatible with minimal modifications.

In another exemplary embodiment, the inserts 21 may be compatible with multiple garments 1. In one example, a customer may want to have a jacket with their school inscription on the insert, and a gym bag with their intermural team inscription on the insert. There may come a time when the customer wants the school inscription on the gym bag and the intermural team inscription on the jacket. The inventory process allows the interchangeability of inserts 21 if the inserts 21 are of a standard size.

In another exemplary embodiment, a customer may wish to purchase a garment 1 with a inscription, but may be wary of making a large purchase if the garment 1 cannot readably be used without the inscription. In an example, a customer may purchase a jacket with their schools inscription on the insert 21. The customer may be less inclined to purchase the jacket in question if there is no way to remove the school insignia in the future, allowing the jacket to be more versatile. This inventory process allows the customer to make a purchase confident that the garment 1 may be updated to reflect the customer's situation in the future.

In another exemplary embodiment, the inventory process may be used for any form of personal item where inscriptions are commonly exposed to the public, including but not limited to, jackets, shirts, and bags.

In another exemplary embodiment, the inventory process may be adapted to place an inscription on any item, regardless of type, as long as the pocket 16 may be placed on the item for inscription installation with the insert 21.

Therefore, the present disclosed inventory process is well adapted to attain the ends and advantages mentioned as well as those that are inherent therein. The particular embodiments disclosed are illustrative only, as the presently disclosed inventory process may be modified and practiced in different but equivalent manners apparent to those having ordinary skill in the art and having the benefit of the teachings herein.

Having described some exemplary embodiments of the presently disclosed inventory process, it is believed that various modifications are within the purview of those in the art without departing from the scope and spirit of the invention. While numerous changes may be made by those having ordinary skill in the art, such changes are encompassed within the spirit of the disclosed inventory process as defined by the appended claims. Furthermore, no limitations are intended to the details of the process herein shown, other than those in the claims below. It is therefore evident that the particular exemplary embodiments disclosed above may be altered or modified and all such variations are considered within the scope and sprit of the present disclosed process. The terms in the claims have their plain, ordinary meaning unless otherwise explicitly and clearly defined by the patentee.

The invention claimed is:

1. An inventory process of providing customized garments, units of which are characterized by:
   (1) first construction units comprising:
      (a) a main body having inner and outer surfaces;
      (b) at least one pocket having a first inner and a first outer surface defining a slot between the outer surface of the main body and the first inner surface of the pocket, said pocket being affixed to the outer surface of said main body, said pocket having an opening there into;
   (2) second construction units comprising;
      (a) an insert selectively slideably receivable within and removable from said slot, said insert having a flap portion at one end thereof and protruding at least partially outside of and over said pocket; and
      (b) means for selectively securing the insert within the pocket, said process comprising the steps of:
         (i) acquiring an inventory of said first construction units, said first construction units being of different sizes and having a pocket of varying sizes and configurations affixed in various locations upon said outer surface;
         (ii) acquiring an inventory of said second construction units, said second construction units being of different sizes and configurations for complimentary receipt into said pockets;
         (iii) applying inscriptions onto a selected number of said flap portions; and
         (iv) assembling selected first construction units and selected second construction units by inserting one of said second construction units into each of the pockets of said first construction units and selectively but removeably securing each of said second construction units into position within each of said pockets, such that the flap portion of said second construction unit with said inscriptions thereon protrudes outwardly of said pocket.

2. The inventory process from claim 1, wherein said inventory process further comprises the steps of:
   receiving orders for said customized garments from customers; and
   applying inscriptions as instructed in said orders from said customers.

3. The inventory process from claim 1, wherein said inventory process further comprises the step of receiving orders for said first construction units and said second construction units.

4. The inventory process from claim 1, wherein said inventory process further comprises the step of receiving orders for said first construction units.

5. The inventory process from claim 1, wherein said inventory process further comprises the step of receiving orders for a said second construction units.

6. The inventory process from claim 1, wherein said inventory process further comprises the step of placing orders for said first construction units and said second construction units.

7. The inventory process from claim 1, wherein said inventory process further comprises the step of placing orders for said first construction units.

8. The inventory process from claim 1, wherein said inventory process further comprises the step of placing orders for a said second construction units.

9. The inventory process from claim 1, wherein said inventory process further comprises additional second construction units comprising:
   (a) an insert selectively slideably receivable within and removable from said slot, said insert having a flap portion at one end thereof and protruding at least partially outside of and over said pocket; and
   (b) means for selectively securing the insert within the pocket, said process comprising the steps of:
      (i) acquiring an inventory of said additional second construction units, said additional second construction units being of different sizes and configurations for complimentary receipt into said pockets;
      (ii) applying inscriptions onto a selected number of said flap portion;
      (iii) assembling selected first construction units and selected additional second construction units by inserting one of said additional second construction units into each of the pockets of said first construction units and selectively but removeably securing each of said additional second construction units into position within each of said pockets, such that the flap portion of said additional second construction units with said inscriptions thereon protrudes outwardly of said pocket; and
   wherein said additional second construction units may be used in the place of said second construction units as needed.

10. The inventory process from claim 1, wherein said insert has a customized inscription.

11. The inventory process from claim 1, wherein said first construction units and said second construction units are provided from a common source.

12. The inventory process from claim 1, wherein said first construction units and said second construction units are provided from a plurality of sources.

13. The inventory process from claim 1, wherein at least one of said first construction units and said second construction units are provided from an independent contractor.

14. The inventory process from claim 1, wherein said first construction units are created by adding said at least one pocket a pre-existing said main body.

15. The inventory process from claim 1, further comprising,
   (1) additional first construction units comprising:
      (a) a main body having inner and outer surfaces;
      (b) at least one pocket having a first inner and a first outer surface defining a slot between the outer surface of the main body and the first inner surface of the pocket, said pocket being affixed to the outer surface of said main body, said pocket having an opening there into;
   (2) additional second construction units comprising;
      (a) an insert selectively slideably receivable within and removable from said slot, said insert having a flap portion at one end thereof and protruding at least partially outside of and over said pocket; and
      (b) means for selectively securing the insert within the pocket, said process comprising the steps of:
         (i) acquiring an inventory of said additional first construction units, said additional first construction units being of different sizes and having a pocket of varying sizes and configurations affixed in various locations upon said additional outer surface;
         (ii) acquiring an inventory of said additional second construction units, said additional second construction units being of different sizes and configurations for complimentary receipt into said pockets;
         (iii) applying inscriptions onto a selected number of said additional flap portion; and
         (iv) assembling selected additional first construction units and selected additional second construction units by inserting one of said additional second construction units into each of the pockets of said additional first construction units and selectively but removeably securing each of said additional second construction units into position within each of said pockets, such that the flap portion of said additional second construction units with said additional inscriptions thereon protrudes outwardly of said pocket,
   (3) wherein said first construction units may be coupled to said second construction units and said additional first construction units may be coupled with said additional second construction units, and
   (4) wherein said first construction units may be coupled to said additional second construction units and said additional first construction units may be coupled with said second construction units.

16. The inventory process from claim 1, wherein said second construction units may be decoupled from said first construction units without assistance.

* * * * *